United States Patent
Onohara et al.

(10) Patent No.: US 7,758,064 B2
(45) Date of Patent: Jul. 20, 2010

(54) AIRBAG APPARATUS

(75) Inventors: Keisuke Onohara, Tokyo (JP);
Motokazu Nakagawa, Tokyo (JP)

(73) Assignee: Takata Corporation, Tokyo (JP)

( * ) Notice: Subject to any disclaimer, the term of this patent is extended or adjusted under 35 U.S.C. 154(b) by 430 days.

(21) Appl. No.: 11/988,458

(22) PCT Filed: Jan. 23, 2007

(86) PCT No.: PCT/JP2007/050965

§ 371 (c)(1),
(2), (4) Date: Jan. 8, 2008

(87) PCT Pub. No.: WO2007/108226

PCT Pub. Date: Sep. 27, 2007

(65) Prior Publication Data

US 2010/0127482 A1    May 27, 2010

(30) Foreign Application Priority Data

Mar. 15, 2006  (JP) ............................. 2006-070849

(51) Int. Cl.
*B60R 21/20* (2006.01)
(52) U.S. Cl. .................. 280/728.2; 280/728.3
(58) Field of Classification Search ............. 280/782.2, 280/728.3, 732, 751, 752
See application file for complete search history.

(56) References Cited

U.S. PATENT DOCUMENTS

| 5,295,707 | A * | 3/1994 | Satoh et al. | 280/728.2 |
| 5,482,313 | A | 1/1996 | Ikeya et al. | |
| 6,039,342 | A * | 3/2000 | Sasaki | 280/728.3 |
| 6,336,661 | B1 | 1/2002 | Amamori | |
| 6,543,802 | B1 * | 4/2003 | Uchiyama et al. | 280/728.2 |
| 6,877,766 | B2 * | 4/2005 | Mikolajewski | 280/728.2 |
| 7,377,540 | B2 * | 5/2008 | Tsujimoto et al. | 280/728.2 |
| 7,614,644 | B2 * | 11/2009 | Hoffmann et al. | 280/728.2 |
| 2002/0153711 | A1 | 10/2002 | Bieber et al. | |
| 2005/0140121 | A1 | 6/2005 | Hayashi et al. | |

FOREIGN PATENT DOCUMENTS

JP    H09-020202    1/1997

(Continued)

*Primary Examiner*—Paul N Dickson
*Assistant Examiner*—Laura Freedman
(74) *Attorney, Agent, or Firm*—Manabu Kanesaka

(57) ABSTRACT

An airbag device where a case and a lid are connected by engaging a hook of the case with a hook hole in the lid and where the hook moves in the hook hole toward the vehicle interior side when the lid recedes. Energy absorption characteristics when the lid recedes are improved by a simple structure. The hook (18) used for connection to the lid (20) and provided at the case (10) is engaged with the hook hole (25) of the lid (20). The hook hole (25) is a long hole elongated in the vertical direction, and in the middle of the long hole is provided a partition-like section (26) for partitioning the inside of the hook hole (25) into the upper half and the lower half. The hook (18) is engaged with that portion of the hook hole (25) which is lower than the partition-like section (26). As the lid (20) recedes, the hook (18) moves upward in the hook hole (25) while cutting the partition-like section (26).

6 Claims, 7 Drawing Sheets

FOREIGN PATENT DOCUMENTS

| | | |
|---|---|---|
| JP | H09-150701 | 6/1997 |
| JP | H10-16691 | 1/1998 |
| JP | H10-264754 | 10/1998 |
| JP | H11-291854 | 10/1999 |
| JP | 2000-185619 | 7/2000 |
| JP | 2001-233163 | 8/2001 |
| JP | 2001-322524 | 11/2001 |

* cited by examiner

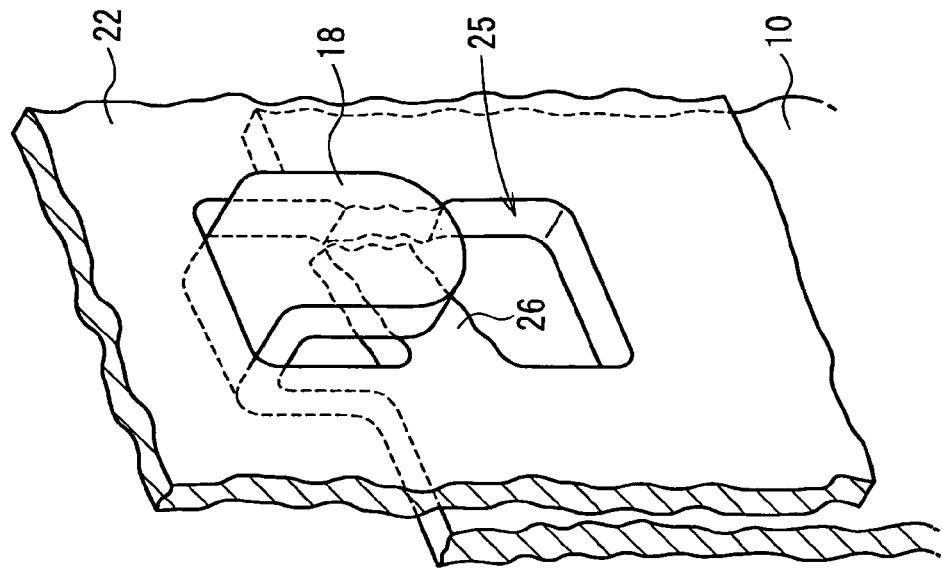
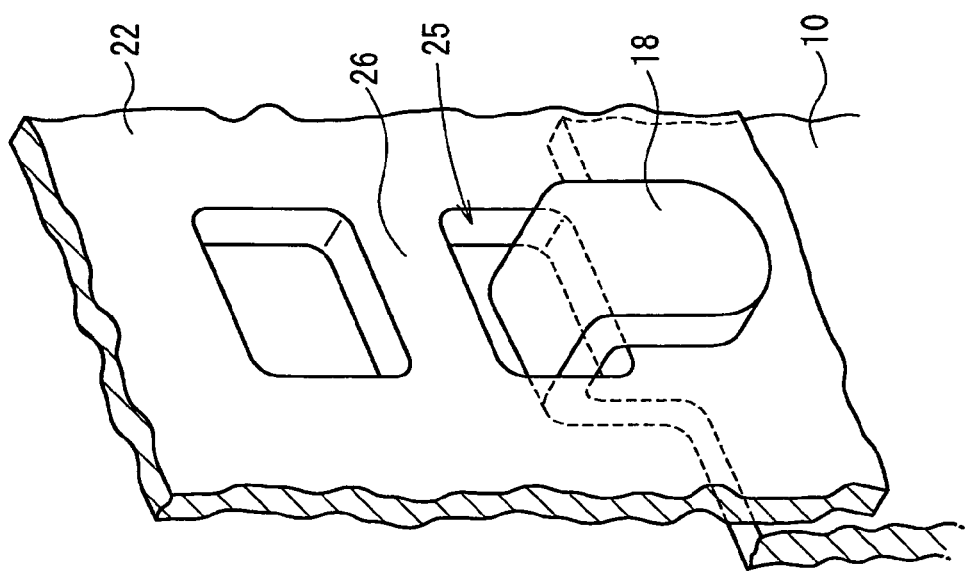

AIRBAG APPARATUS

TECHNICAL FIELD

The present invention relates to airbag apparatuses that can absorb the energy applied to a lid covering an open outlet on the cabin side of a case accommodating an airbag therein by means of the retraction of the lid away from the cabin when an occupant pushes the lid by the movement toward the lid, and in particular, it relates to an airbag apparatus in that the case is provided with a hook for connection to the lid as well as the lid is provided with a hook hole engaged with the hook, such that the hook relatively moves toward the cabin within the hook hole along with the retraction of the lid.

BACKGROUND ART

The airbag apparatus has been known, which can absorb the energy applied to the lid covering the open outlet on the cabin side of the case accommodating the airbag therein by means of the retraction of the lid away from the cabin when an occupant pushes the lid by the movement toward the lid.

Japanese Unexamined Patent Application Publication No. 2000-185619 describes an airbag apparatus in that the case is connected to the lid by bringing the hook provided in the case into engagement with the hook hole provided in the lid. In the airbag apparatus described in the Publication, the hook hole is a long hole lengthwise extending toward the cabin, and when the lid is pressed by an occupant, the lid is retracted along the hook hole. At this time, the hook relatively moves toward the cabin.

[Patent Document 1] Japanese Unexamined Patent Application Publication No. 2000-185619

DISCLOSURE OF INVENTION

It is an object of the present invention to provide an airbag apparatus capable of improving absorbing characteristics of the energy during the retracting of a lid with a simple configuration, in which a case is connected to the lid by bringing a hook provided in the case into engagement with a hook hole provided in the lid and when the lid is retracted, the hook relatively moves within the hook hole toward a cabin.

An airbag apparatus according to the present invention includes an airbag inflatable by gas from an inflator; a case accommodating the airbag therein and having an open outlet to be opened toward a cabin; and a lid connected to the case retractably in a direction away from the cabin relative to the case for covering the open outlet, the case being provided with a hook for connection to the lid, the lid being provided with a hook hole to be engaged with the hook, and along with the retraction of the lid, the hook relatively moving within the hook hole toward the cabin, in which the airbag apparatus further includes a low-strength part arranged at an edge of the hook hole or within the hook hole for absorbing energy due to its shearing or its plastic deformation produced by the abutment of the hook when the hook moves toward the cabin.

According to one embodiment of the present invention, the hook hole is an elongated hole extending in the movement direction of the hook, and the low-strength part is a parting part arranged at an intermediate portion of the hook hole in the extending direction for dividing the hook hole into the cabin side and the side opposite thereto, and the hook is arranged in the hook hole on the side opposite to the cabin from the parting part, and along with the retraction of the lid, the hook moves within the hook hole toward the cabin while shearing off or plastically deforming the parting part.

According to another embodiment of the present invention, the low-strength part is formed by reducing the thickness of the edge part of the hook hole adjacent to the cabin smaller than those of peripheral parts, and along with the retraction of the lid, the hook moves toward the cabin while shearing off or plastically deforming the edge part adjacent to the cabin of the hook hole.

BRIEF DESCRIPTION OF THE DRAWINGS

FIGS. 4a and 4b are enlarged perspective views of the vicinity of a hook hole, showing states during non-retracting of the lid of the airbag apparatus shown in FIG. 1 and during retracting of the lid, respectively.

DETAILED DESCRIPTION

In the airbag apparatus according to the present invention (claim 1), when the lid is retracted by the pushing of an occupant, along with the retraction of the lid, the hook, which connects the case accommodating the airbag therein to the lid, relatively moves within the hook hole toward the cabin. At this time, the hook moves within the hook hole while shearing off or plastically deforming the low-strength part arranged at an edge of the hook hole or within the hook hole, so that the energy absorbing amount applied to the lid is increased in comparison with the airbag apparatus described in Japanese Unexamined Patent Application Publication No. 2000-185619, in which the hook only moves within the hook hole.

The low-strength part may be formed as a parting part dividing the hook hole into the cabin side and the side opposite thereto like in claim 2, and it may also be formed by reducing the thickness of the edge part of the hook hole adjacent to the cabin smaller than those of peripheral parts like in claim 3. In any of the cases, with a simplified structure, the energy absorbing characteristics during the retraction of the lid can be improved.

Embodiments according to the present invention will be described below with reference to the drawings.

Figure 1:
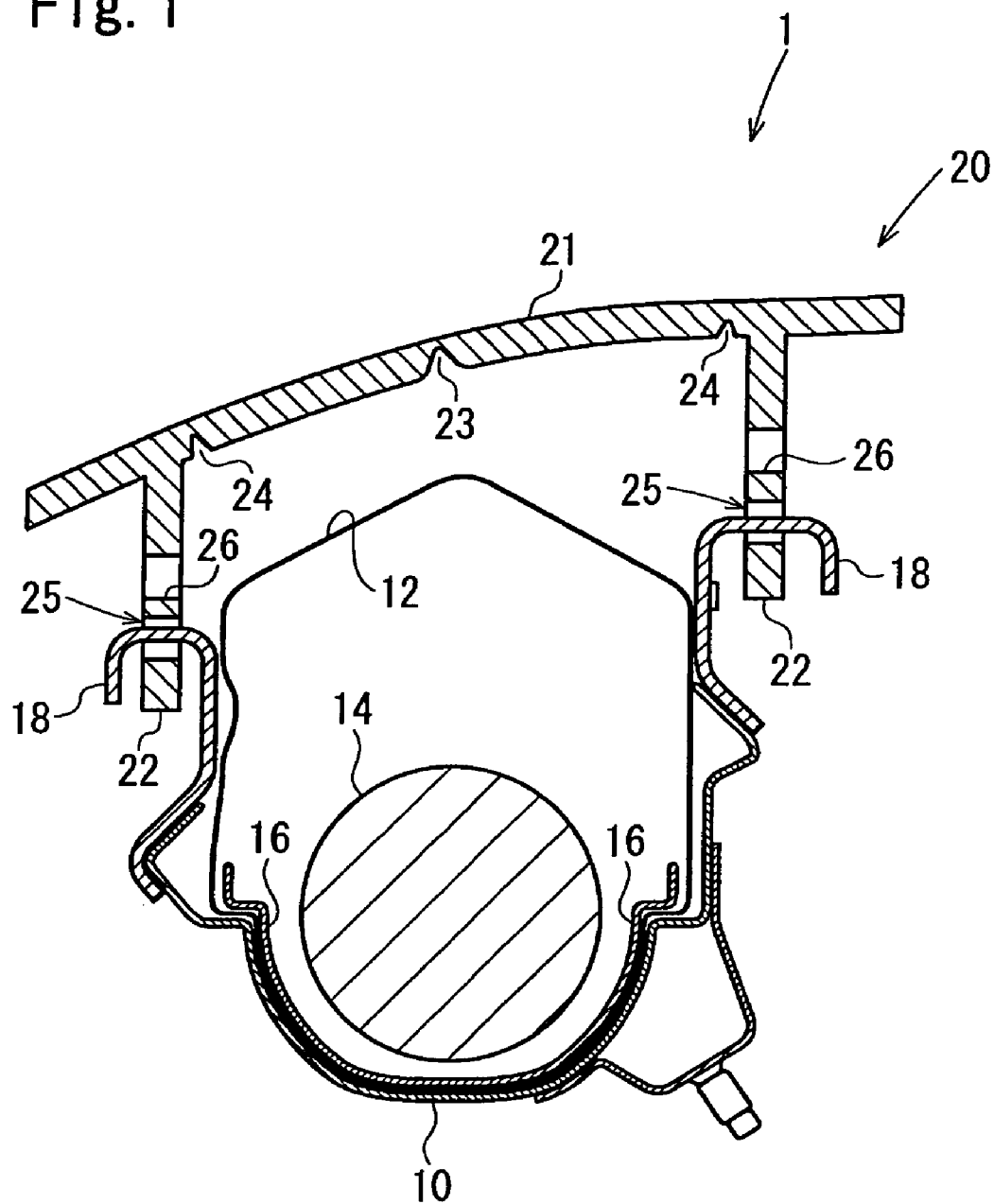
FIG. 1 is a sectional view of an airbag apparatus according to an embodiment, showing a state during non-retracting of a lid.
Figure 2:
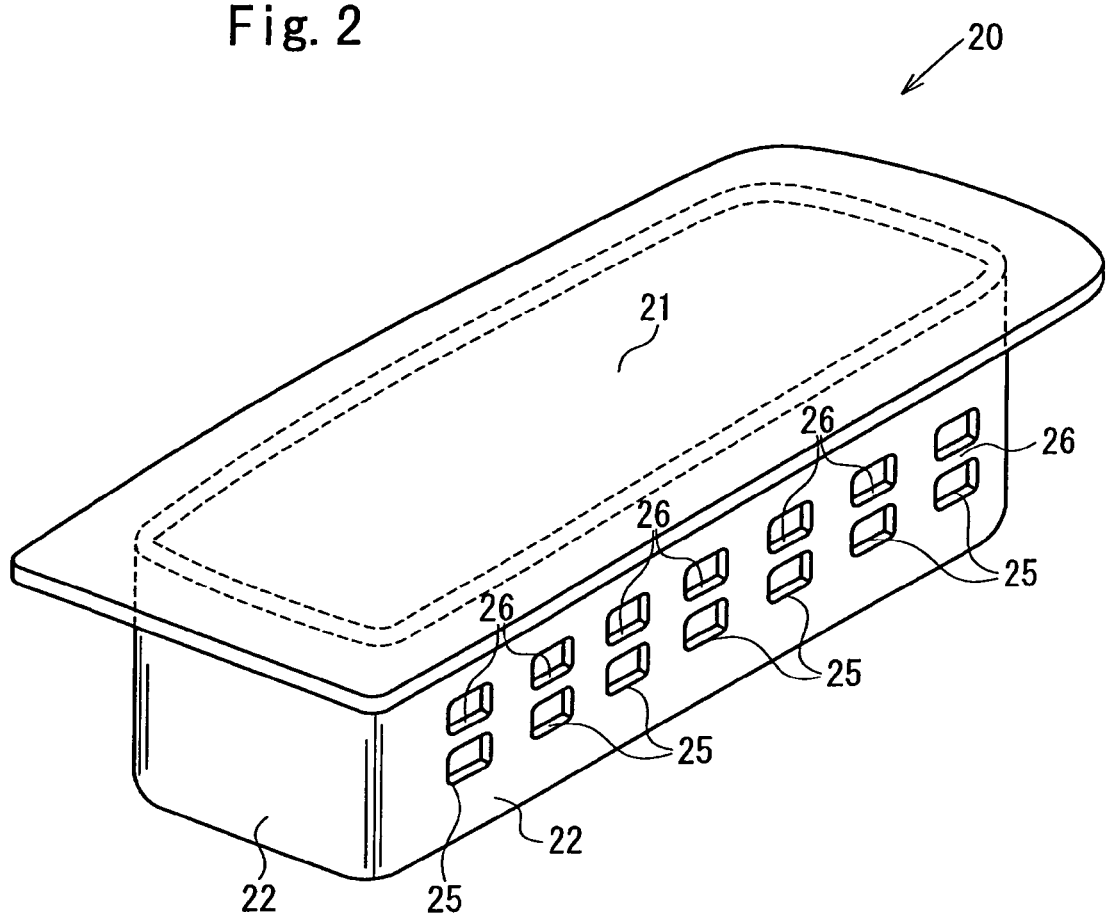
FIG. 2 is a perspective view of the lid of the airbag apparatus shown in FIG. 1.
Figure 3:
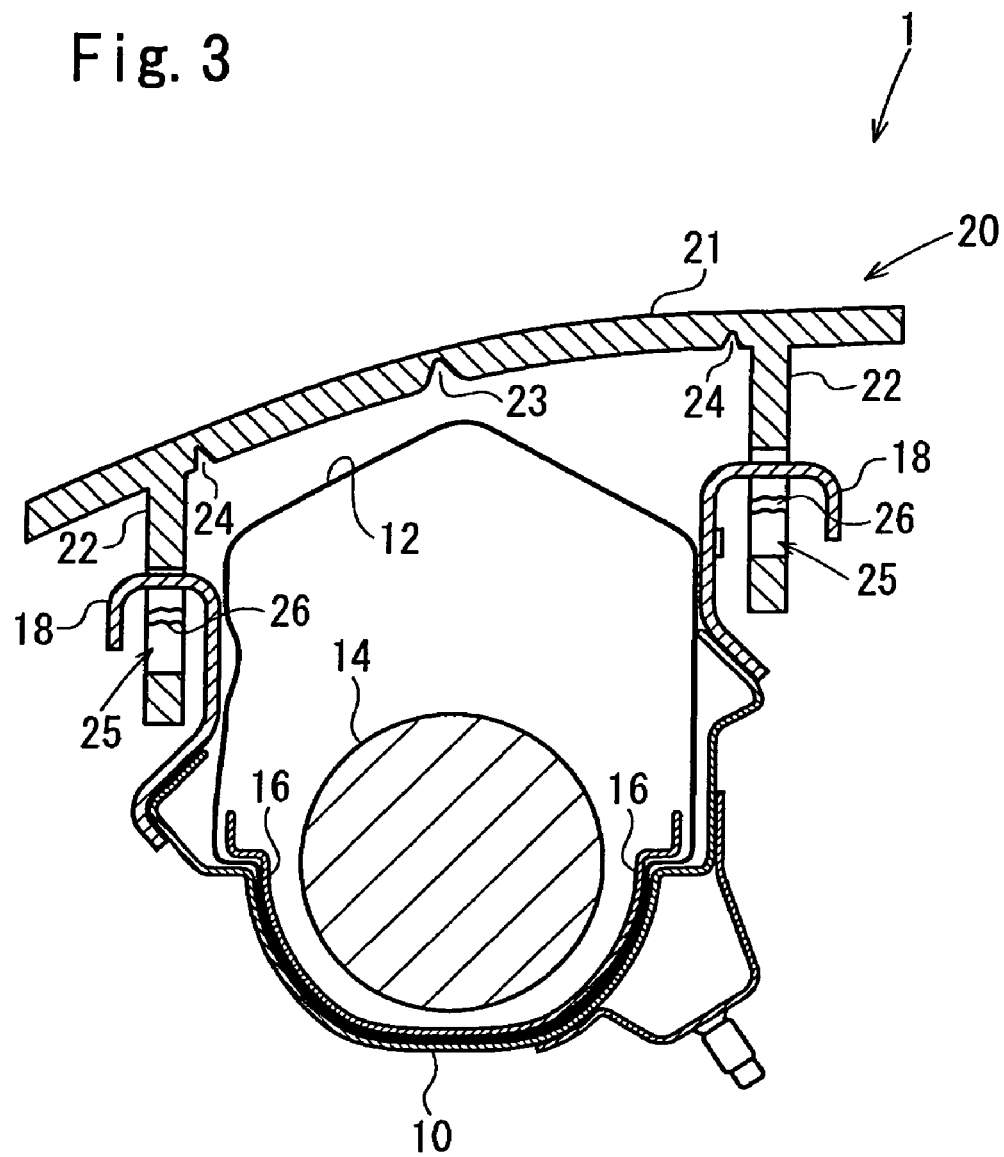
FIG. 3 is a sectional view of the airbag apparatus shown in FIG. 1, showing a state during retracting of the lid.

FIG. 1 is a sectional view showing a lid in a non-retracted state of an airbag apparatus according to an embodiment; FIG. 2 is a perspective view of the lid of the airbag apparatus; FIG. 3 a sectional view showing the lid in a retracted state of the airbag apparatus; and FIGS. 4a and 4b are enlarged perspective views of the vicinity of a hook, showing the non-retracted and the retracted states of the lid, respectively.

In the description below, the vertical direction indicates the vertical direction in the drawings. In each drawing, when the airbag apparatus is arranged in an automobile, a cabin is directed upward in the drawing, and vice versa.

An airbag apparatus 1 according to the embodiment is a passenger airbag apparatus provided in an instrument panel (not shown) of the automobile.

The airbag apparatus 1 includes a case 10 having an open outlet (reference numeral omitted) on its upper surface, an airbag 12 folded and accommodated within the case 10, an inflator 14 for inflating the airbag 12, and a lid 20 mounted on the case 10 for covering the upper-surface open outlet of the case 10. The reference numeral 16 denotes a mounting tab for mounting the airbag 12 in the case 10. The lid 20 is connected to the case 10 retractably in a downward direction relative to the case 10, i.e., away from the cabin. The connection structure will be described later.

The lid 20 includes a principal plate part 21 covering the upper-surface open outlet and a leg-piece part 22 downward erected from the bottom surface of the principal plate part 21 along the outer peripheral surface of the case 10. As shown in FIG. 2, according to the embodiment, the leg-piece part 22 is a frame surrounding the outer periphery of the case 10.

The principal plate part 21 is to cleave from the center to be opened out when the airbag 12 is inflated. According to the embodiment, the principal plate part 21 is provided with a tear line 23 longitudinally formed on the bottom surface across the vicinity of its center and made of a concave groove. The cleavage of the principal plate part 21 is induced along the tear line 23. In the vicinity of the corner of the principal plate part 21 intersecting with the inner peripheral surface of the leg-piece part 22, a concave-groove hinge part 24 is provided for facilitating the principal plate part 21 to be cleaved along the tear line 23 to open out like a door by being pushed by the airbag 12.

Hooks 18 are protruded from the periphery of the open outlet of the case 10 toward the outside. In the leg-piece part 22 surrounding the open outlet, parts overlapping with the hooks 18 are provided with hook holes 25 formed thereon. The lid 20 is connected to the case 10 by bringing the hooks 18 into engagement with the hook holes 25, respectively.

According to the embodiment, as shown in FIG. 2 and FIG. 4a, the hook hole 25 is an elongated hole lengthwise extending in the vertical direction, and is provided with a parting part 26 formed in its intermediate portion in the extending direction for dividing the hook hole 25 into the upper part and the lower part (i.e., the cabin side and the side opposite thereto). The parting part 26 traverses the hook hole 25 and its both ends continue into both edges of the hook hole 25, respectively. The hook 18, as shown in FIG. 4a, is brought into engagement with part of the hook hole 25 lower than the parting part 26.

The parting part 26 has a configuration in that it is shorn off when a predetermined pressure or more is applied from the hook 18. That is, according to the embodiment, a low-strength part is provided by the parting part 26.

Although not shown, the airbag apparatus 1 is arranged within an aperture for installing an airbag apparatus provided in an instrument panel. At this time, the airbag apparatus 1 overlaps with the instrument panel so that the principal plate part 21 of the lid 20 covers the aperture.

Then, the operation of the airbag apparatus 1 configured in such a manner will be described.

If an automobile having the airbag apparatus 1 is collided at a predetermined speed or more, the inflator 14 is operated to blow out gas so as to inflate the airbag 12 by the gas from the inflator 14. The airbag 12 pushes the principal plate part 21 of the lid 20 to be opened by cleaving it, and the airbag 12 is bulged in the cabin through the open outlet of the case 10. An occupant is received by the inflated airbag 12.

On the other hand, if an automobile having the airbag apparatus 1 is collided at a speed below a predetermined one, since the inflator 14 is not operated so that the airbag 12 is not bulged in the cabin, an occupant may move toward the lid 20 so as to push it.

In the airbag apparatus 1, when the occupant pushes the lid 20, as shown in the drawing, the lid 20 is downward moved (i.e., in the direction away from the cabin). Along with the retraction of the lid 20, the hook 18 connecting the case 10 to the lid 20 relatively moves upward within the hook hole 25 as states shown from FIG. 4a to FIG. 4b. At this time, as shown in FIG. 4b, the hook 18 abuts the parting part 26 within the hook hole 25 so as to break it. As a result, in comparison with a case where the hook 18 only moves within the hook hole 25, the energy absorbing amount is increased.

As described above, in the airbag apparatus 1A, with a simplified structure in that the hook hole 25 is an elongated hole extending upward and is provided with only the parting part 26 formed in an intermediate portion, the energy absorbing characteristics of the lid 20A during the retraction can be improved.

According to the embodiment, one parting part 26 is provided in the hook hole 25; alternatively, a plurality of the parting parts 26 may also be provided so that they are located at positions different from each other in the extending direction of the hook hole 25. When the hook 18 moves within the hook hole 25, the plurality of the parting parts 26 are sequentially broken, so that the energy absorbing amount is further increased.

Figure 5:
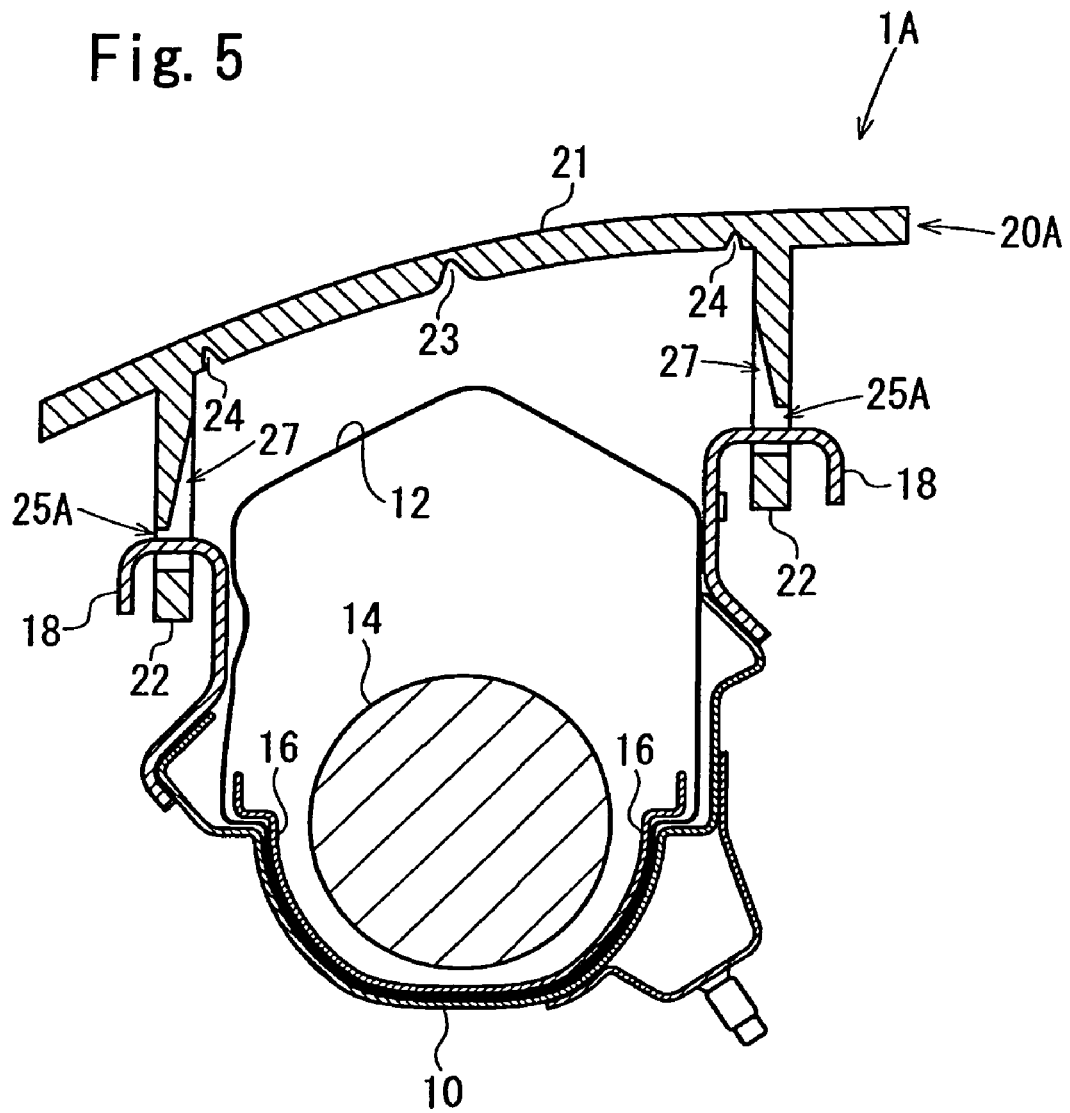
FIG. 5 is a sectional view of an airbag apparatus according to another embodiment, showing a state during non-retracting of a lid.
Figure 6:
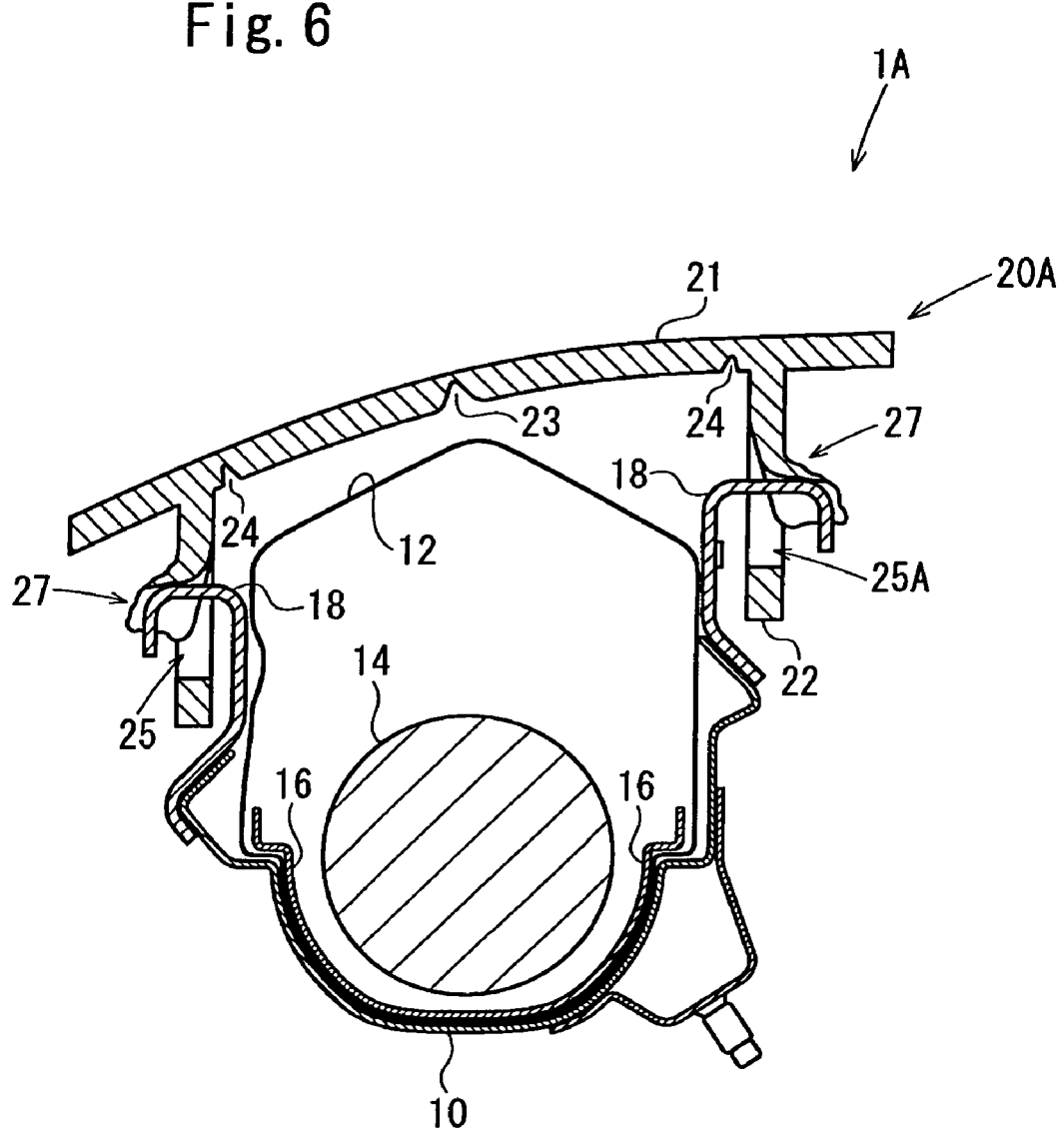
FIG. 6 is a sectional view of the airbag apparatus shown in FIG. 5, showing a state during retracting of the lid.
Figure 7A:
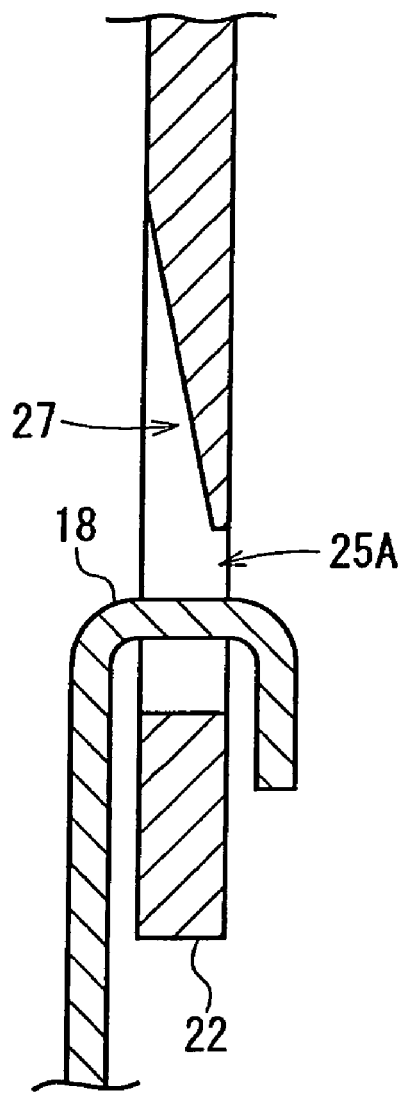
FIGS. 7a and 7b are enlarged sectional views of the vicinity of a hook hole, showing states during non-retracting of the lid of the airbag apparatus shown in FIG. 5 and during retracting of the lid, respectively.
Figure 7B:
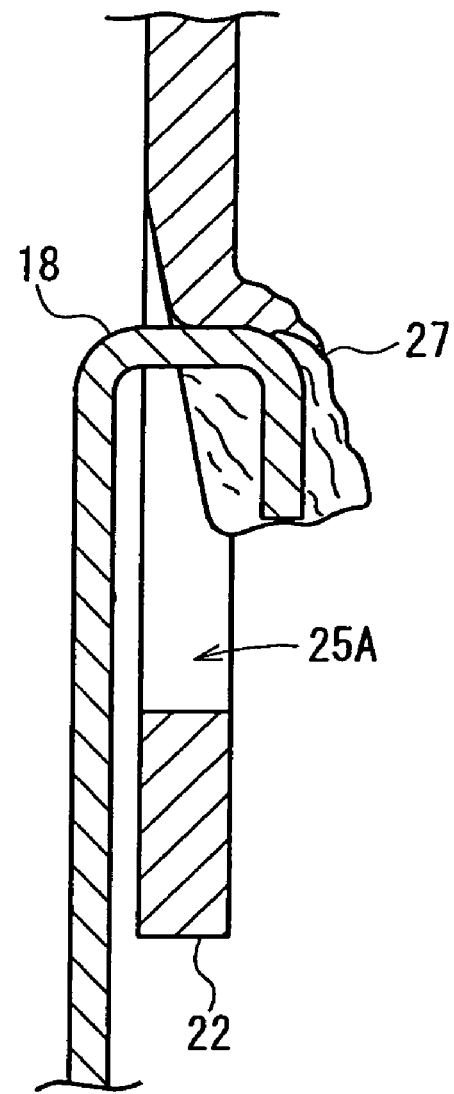

FIG. 5 is a sectional view of an airbag apparatus according to another embodiment showing a lid in a non-retracted state; FIG. 6 is a sectional view of the airbag apparatus showing the lid in a retracted state; and FIGS. 7a and 7b are enlarged sectional views of the vicinity of a hook hole showing the lid in a non-retracted state and a retracted state, respectively.

In the airbag apparatus 1A according to this embodiment, as shown in FIG. 5, a lid 20A is provided with a hook hole 25A, and the hook 18 of the case 10 is brought into engagement with the hook hole 25A.

According to the embodiment, by reducing the thickness of the part continuing to the upper edge of the hook hole 25A in the leg-piece part 22 of the lid 20A smaller than those of other parts, a low-strength part 27 is formed on the upper edge side of the hook hole 25A. As shown in enlarged FIG. 7a, according to the embodiment, the low-strength part 27 has a tapered sectional shape with a thickness increasing with separating distance from the hook hole 25A.

The other configurations of the airbag apparatus 1A are the same as those of the airbag apparatus 1 shown in FIGS. 1 to 4b, and in FIGS. 5 to 7b, like reference numerals designate like components common in FIGS. 1 to 4b.

Even in the airbag apparatus 1A, when an occupant moves toward the lid 20A so as to push the lid 20A, the lid 20A is downward retracted. Along with the retraction of the lid 20A, the hook 18 relatively moves upward within the hook hole 25A. At this time, as states shown from FIG. 7a to FIG. 7b, the hook 18 abuts the upper edge of the hook hole 25A so as to upward move while shearing off or plastically deforming the low-strength part 27 continuing to the upper edge of the hook hole 25A. As a result, in comparison with a case where the hook 18 simply moves within the hook hole 25, the energy absorbing amount is much more increased.

According to the embodiment, with separating distance from the hook hole 25A, the thickness of the low-strength part 27 becomes larger, so that the energy absorbing amount becomes larger as the hook 18 moves toward the upper end of the low-strength part 27. However, the low-strength part 27 may also be constant in thickness from the lower end to the upper end.

As described above, even in the airbag apparatus 1A, with a simplified structure in that the thickness of the hook hole 25A adjacent to its upper edge is only reduced, the energy absorbing characteristics of the lid 20A during the retraction can be improved.

Any of the embodiments described above shows an example of the present invention, so that the present invention is not limited to the embodiments described above.

For example, according to the embodiment shown in FIGS. 5 to 7b, in the leg-piece part 22 of the lid 20A, the low-strength part 27 is formed by reducing the thickness of the part of the hook hole 25A adjacent to the upper edge smaller than those of other parts; alternatively, the low-strength part 27 may also be formed by making part of the hook hole 25A adjacent to the upper edge of a low-strength material with a strength lower than those of other parts.

Also, other than reducing the thickness of the part of the hook hole 25A adjacent to the upper edge, the low-strength part may also be formed by other structural means, such as providing a number of small holes (may be potholes or through-holes).

According to the embodiments described above, the lids 20 and 20A are structured independently from the instrument panel; however, they may be structured integrally with the instrument panel, respectively.

The embodiments described above show examples applied to the passenger airbag apparatus according to the present invention; however, the present invention may be obviously incorporated in various airbag apparatuses other than the passenger airbag apparatus.

This application is based on Japanese Patent Application filed on Nov. 15, 2006 (Japanese Patent Application No. 2006-070849), and its entire is quoted by the reference cited.

The invention claimed is:

1. An airbag apparatus comprising:
    an airbag inflatable by gas from an inflator;
    a case accommodating the airbag therein and having an open outlet to be opened toward a cabin; and
    a lid connected to the case retractably in a direction away from the cabin relative to the case for covering the open outlet, the case being provided with a hook for connection to the lid, the lid being provided with a hook hole to be engaged with the hook, and along with the retraction of the lid, the hook relatively moving within the hook hole toward the cabin,
    wherein the airbag apparatus further comprises a low-strength part arranged at an edge of the hook hole or within the hook hole for absorbing energy due to its shearing or its plastic deformation produced by the abutment of the hook when the hook moves toward the cabin.

2. The airbag apparatus according to claim 1, wherein the hook hole is an elongated hole extending in the movement direction of the hook, and the low-strength part is at least one parting part arranged at an intermediate portion of the hook hole in the extending direction for dividing the hook hole into a cabin side and a side opposite thereto, and
    wherein the hook is arranged in the hook hole on the side opposite to the cabin from the parting part, and along with the retraction of the lid, the hook moves within the hook hole toward the cabin while shearing off or plastically deforming the parting part.

3. The airbag apparatus according to claim 2, wherein one parting part is provided in each of a plurality of the hook holes.

4. The airbag apparatus according to claim 2, wherein a plurality of the parting parts are provided in each of a plurality of the hook holes such that the parting parts are located at positions different from each other in the longitudinal direction of the hook hole.

5. The airbag apparatus according to claim 1, wherein the low-strength part is formed by reducing the thickness of the edge part of the hook hole adjacent to the cabin smaller than those of peripheral parts, and
    wherein along with the retraction of the lid, the hook moves toward the cabin while shearing off or plastically deforming the edge part adjacent to the cabin of the hook hole.

6. The airbag apparatus according to claim 5, wherein the low-strength part increases in thickness toward the lid.

* * * * *